United States Patent [19]

Barton

[11] 4,313,747

[45] Feb. 2, 1982

[54] PROCESS FOR MAKING GLASS WITH AGGLOMERATED REFINING AGENTS

[75] Inventor: James L. Barton, Paris, France

[73] Assignee: Societe Generale pour l'Emballage, Paris, France

[21] Appl. No.: 150,582

[22] Filed: May 16, 1980

[30] Foreign Application Priority Data

May 17, 1979 [FR] France ................................ 79 12572

[51] Int. Cl.$^3$ .............................................. C03B 1/00
[52] U.S. Cl. ........................................ 65/27; 65/134; 106/DIG. 8
[58] Field of Search .............. 65/134, 27; 106/DIG. 8

[56] References Cited

U.S. PATENT DOCUMENTS

| | | | |
|---|---|---|---|
| Re. 26,328 | 1/1968 | Monks | 106/DIG. 8 |
| 360,840 | 4/1887 | Adams | 106/DIG. 8 |
| 3,150,991 | 9/1964 | Monks | 106/DIG. 8 |
| 3,240,581 | 3/1966 | O'Connell et al. | 65/134 X |
| 3,511,629 | 5/1970 | Bauer et al. | 65/134 |
| 3,589,885 | 6/1971 | Monks | 65/134 |
| 3,994,708 | 11/1976 | von Reth et al. | 65/134 X |
| 4,074,989 | 2/1978 | Brzozowski et al. | 65/27 |
| 4,074,990 | 2/1978 | Brzozowski et al. | 65/27 |
| 4,074,991 | 2/1978 | Brzozowski et al. | 65/27 |

OTHER PUBLICATIONS

Engelleitner, "Pellets Cut Cost, Improve Quality", The Glass Industry, Mar. 1972, pp. 8, 9, 10 and 30.
Manring et al., "Reduced Sulfur Compounds...", The Glass Industry, vol. 48, No. 7, Jul. 1967, pp. 374–380.

*Primary Examiner*—Richard V. Fisher
*Attorney, Agent, or Firm*—Pennie & Edmonds

[57] ABSTRACT

Refining agents comprising intimate mixtures of finely-divided sulfates and reducing agents are added to vitrifiable charges of glassmaking raw materials prior to melting the raw materials so that, when the charge is melted, the refining agent will evolve bubbles of sulfur dioxide gas which will remove smaller bubbles of other gases from the molten glass as these bubbles rise to the surface of the molten glass. The metal sulfates and reducing agents (preferably carbon) employed in the refining agent have a particle size of less than about 0.1 mm and are formed into homogeneous agglomerates having a size of about 1 to 5 mm. The glassmaking raw materials are also finely-divided and may be used in this form or may be formed into agglomerates of about the same size as, or containing the agglomerated refining agent. The relative amounts of reducing agent to sulfur in the refining agent is such that at least one-fourth of the sulfate present will be reduced to the sulfide form, and the amount of refining agent employed is such that the amount of added sulfur expressed as $SO_3$ is at least 0.05% by weight of the glass to be obtained.

12 Claims, No Drawings

PROCESS FOR MAKING GLASS WITH AGGLOMERATED REFINING AGENTS

TECHNICAL FIELD

This invention relates to the known process for making glass wherein a refining agent comprising a mixture of metal sulfates and a reducing agent is added to the vitrifiable charge of glassmaking raw materials prior to melting of the charge, and, more particularly, to an improvement in the manner of adding the refining agent to the vitrifiable charge.

BACKGROUND ART

The process of refining glass is the subject of various theories, but practice generally provides for the introduction into the vitrifiable charge of glassmaking raw materials of certain agents, called refining agents, able to give rise to the release of gas in a range of high temperatures, corresponding to slight viscosities of the glass, said gas being able to be reabsorbed by the molten glass at lower temperature levels. The ascending bubbles of gas released by the refining agents particularly have a mixing role for the vitreous mass, and also serve to entrain and remove small bubbles whose ascending speed is very slight and which would otherwise be trapped in the melt at the end of the melting.

It is customary to introduce into the vitrifiable mass, as refining agents, various metal sulfates such as sodium sulfate, gypsum, or other sulfate base products bringing metal oxides into the glass composition. It is generally accepted that these sulfates play a favorable role during the melting phase of the process and that, during the refining phase, release $SO_3$ inside the various small bubbles thus causing them to grow in size and rise to the surface. This latter result appears to be facilitated by the use of certain reducing agents which might be expected to lower the solubility of the sulfate and cause $SO_2$ to be evolved.

Therefore, it has become frequent practice to add carbon to certain vitrifiable mixtures containing sulfates. It seems that the presence of carbon facilitates the decomposition of the sulfates and favors the release of $SO_2$ rather than the direct formation of the more soluble $SO_3$. According to another hypothesis, the carbon could also reduce, at least in part, the sulfates into sulfides, which would play a favorable role during melting since, by oxidation or reaction with the sulfates, they would liberate $SO_2$, which could be reoxidized under a layer of surnatant raw materials and thus restore the sulfate to the level where it is most useful to accelerate melting.

Going on this hypothesis, it has also been proposed to introduce sulfur directly into the vitrifiable mixture in the form of sulfides, possibly incorporated in various materials such as blast-furnace slags, by-products of the metallurgical industry, or even frits specially made for this used.

These various improvements each comprise a certain number of drawbacks. Thus, in the processess consisting of introducing metal sulfides in the vitrifiable mixture of glass to be produced, or in a mixture intended for elaboration of an intermediate frit, considerable difficulties appear from the first in preparing the charge, because of the chemical instability, hygroscopicity and toxicity of most of these sulfide salts. Further, during melting, the latter give rise to considerable losses because of their very great vapor pressures.

As far as metallurgical slags are concerned, their use is limited by the lack of consistency in their compositions, and by their great iron content which practically rules out flint glasses, without the costly operation of deferrization.

Of the processes cited above recommending the use of vitrifiable charges containing both metal sulfate and carbon, some show a certain benefit in making their mixture beforehand, in particular the one that proposes the use of ground coke impregnated with a solution of a soluble metal sulfate.

This latter proposal, although an advantageous form of refining material, involves a certain number of constraints, particularly in the choice of the raw materials and in the mode of preparation of the product, and leads to difficulties in use, for example, in avoiding segregation and obtaining a good homogeneity of tint.

The present invention, which makes various improvements in the processes using vitrifiable mixtures containing sulfates and carbon, aims at obtaining results at least as at as high a level as that of the processes using sulfides, while avoiding the various drawbacks mentioned above. It applies to glass compositions that are very diverse both in the nature of their components and in their mode of presentation. It brings very advantageous solutions to certain demanding fabrications, such as those of glasses with a low iron content or a high sulfide content.

The invention very particularly facilitates the refining of glass and also makes possible an acceleration of this operation to increase the pull of the furnace and reduce the temperature at which it is performed, and it also reduces the consumption of fuel, wear of refractories, and loss of certain elements, etc.

SUMMARY OF THE INVENTION

According to the invention, a refining agent comprising a mixture of metal sulfates and a reducing agent is dispersed uniformly throughout the vitrifiable charge of glassmaking raw materials prior to melting the charge, the metal sulfate and reducing agent constituents of the refining agent have a particle size of less than about 0.1 mm, the finely-divided particles of metal sulfate and reducing agent being intimately mixed together and formed into agglomerates at least 10 times greater in size than the average particle size of their constituent materials. The relative amounts of reducing agent and metal sulfate in the agglomerates is such that the reducing agent can reduce at least one-fourth of the sulfate ions present to the state of sulfide ions, and the amount of these potential sulfide ions, expressed as $SO_3$, added by the agglomerates to the glassmaking raw materials is at least 0.05% by weight of the glass to be obtained. The glassmaking raw materials can be in the form of a powder throughout which the agglomerates of refining agent are uniformly distributed (A), or these raw materials can themselves be formed into agglomerates which are mixed with the agglomerates of the refining agent (B), or in which these ones are incorporated (C). In the mode (B), the agglomerates of the raw materials are preferably approximately the same size as the agglomerates of the refining agent..

BEST MODE FOR CARRYING OUT THE INVENTION

In accordance with the invention, finely-divided particles of one or more metal sulfates and one or more reducing agents are thoroughly mixed together and then are formed into agglomerates which are employed in the glassmaking process described herein. The proportions in which the sulfates and reducing agent go into the agglomerates of the invention depend on the conducting of the melting of the glass under consideration. Preferably, the amount of reducing agent employed is such that will result in the reduction of at least a quarter of the sulfate ions ($SO_4^=$) to the state of sulfide ions ($S^=$). The amount of agglomerates to be introduced into the vitrifiable mixture is such that the amount of metal sulfate thereby added to the mixture corresponds to addition of sulfates in prior processes at most on the same order and generally less than those necessary for refining under standard conditions. More specifically, it is desirable to introduce into the vitrifiable mixture an amount of agglomerates corresponding, considering their initial content of reducing agent, to a potential addition of sulfide ions ($S^=$) of at least 0.05%, expressed as $SO_3$, of the weight of the glass to be obtained.

Obviously, the composition of the glass to be made is to be considered in the choice of the carrier or carriers of $SO_4^=$ ions in the formulation of the agglomerates according to the invention. The use of sodium sulfate is not ruled out for glasses containing sodium, but, in the case of the most widely used soda-lime-silica industrial glasses, it is generally advantageous to use a low cost raw material that is slightly soluble, such as gypsum, or plaster of Paris. The use of plaster facilitates the operation of forming suitable granules, since it avoids the use of an extraneous binder.

By way of reducing agent, very reactive carbon is advantageously used, such as charcoal, ground to a particle size of less than 0.1 mm. Less expensive products, such as powdered coke, can also be used, or products of the petroleum industry, such as tar or heavy fuel which are further able to have a favorable action on the forming of granules and on their mechanical characteristics during firing, then during their use.

The dimensions of the agglomerates of the mixture of sulfates and carbon, and consequently their shapes, are critical parameters for using the invention. That is to say, the advantages offered by the invention will be greatly reduced if the agglomerates of sulfate and carbon are too small in relation to the particle size of their constituents. Further, agglomerates too large in size lead to a reduction of the number of agglomerates which has the drawback of excessively increasing the mass of the vitrifiable mixture corresponding to each of them. Thus, in practice, it is advisable that the size of the agglomerates be at least 10 times greater than the average particle size of their constituents, which preferably is less than 0.1 mm, and preferably the agglomerates are in the order of from 1 to 5 mm in size.

The agglomerates can be made by the usual, inexpensive processes, such as by nodulizing plates or by extrusion. The constituents of the agglomerates are advantageously selected to obtain a high degree of resistance to crushing and abrasion during the handling and melting of the charge. The binder can constitute a determining element in this regard. I have found that sodium silicates are particularly useful, but carboxymethylcellulose and similar products are also suitable as binders.

Other advantages and characteristics of the invention will be brought out in the following examples:

EXAMPLE 1

A number of experimental melts of various formulations of glassmaking raw materials were made to compare the results obtained by the processes of the prior art and the process of the present invention. All of the various formulations employed comprised essentially a conventional mixture of glassmaking raw materials to which had been added various kinds and amounts of other materials to modify or refine the melt.

Table I sets forth the composition of the conventional vitrifiable mixture of raw materials common to all of the experimental melts.

TABLE I

| Theoretical Formula of the Glass (% weight) | | Raw Materials (in kg per 100 kg of glass) | |
|---|---|---|---|
| $SiO_2$ | 71.94 | Sand | 71.93 |
| $SO_3$ | 0.20 | Calcined alumina | 1.94 |
| $Fe_2O_3$ | 0.017 | Dehydrated borax | 0.77 |
| $Al_2O_3$ | 2.00 | Dolomite | 16.78 |
| $B_2O_3$ | 0.48 | Sodium fluosilicate | 0.707 |
| F | 0.33 | | |
| CaO | 9.55 | | |
| MgO | 2.88 | | |
| $Na_2O$ | 13.30 | | |

Table II sets forth the kinds and amounts of the other constituents of each experimental melt added thereto either as part of the glassmaking raw materials or as a refining agent of the melt.

Referring first to column 1 of Table II, melts A and B are conventional mixtures to which in melt A there was an addition of $Na_2SO_4$ and charcoal, and in melt B there was an addition of $Na_2SO_4$, charcoal, $NaNO_3$, and $As_2O_3$; melts 1 to 7 are mixtures according to the invention wherein agglomerates formed from finely-divided gypsum and charcoal, of an average a diameter of 2 mm, provide the carbon and at least a part of the sulfur of the charge, these mixtures further possibly containing, in the powdered state, additions of melt B ($NaNO_3$, $As_2O_3$) and/or additional amounts of $Na_2SO_4$; and melts 8 and 9 are mixtures differing from those of the invention in that the agglomerates of gypsum and charcoal therein have been reduced to small grains passing through a screen with a mesh of 0.2 mm. As noted each experimental melt comprised the basic vitrifiable mixture to which various other materials have been added. Columns 2 to 10 of Table II specify the nature and the amounts of these various other materials present in each melt. More particularly, columns 2 to 7 indicate the nature and the amount of the glassmaking materials added to the basic vitrifiable mixture; column 8 shows the total of granulated refining agent added to the melt and also indicates the difference in particle size of the additions to melts 1 to 7 and to melts 8 and 9; and columns 9 and 10 show the total amounts of sulfur (expressed in the form of $SO_3$) and carbon contained in each experimental melt mixture.

Column 11 relates to the quality of the refining, expressed quantitatively by the number of bubbles observed per kg of glass. Finally, the color observed in a great thickness (about 10 cm) of glass is noted in column 12.

TABLE II

| | Vitrifiable Mixtures | | | | | | | Total | | Quality of Refining** (11) | Colors (of great thickness) (12) |
| --- | --- | --- | --- | --- | --- | --- | --- | --- | --- | --- | --- |
| | Additional Glassmaking Raw Material* | | | | | | | Contents | | | |
| Melts (1) | CaO (2) | $Na_2CO_3$ (3) | $Na_2SO_4$ (4) | C (5) | $NaNO_3$ (6) | $As_2O_3$ (7) | Particles (8) | $SO_3$ (9) | C (10) | | |
| A | 6.33 | 22.16 | 0.37 | 0.05 | — | — | — | 0.20 | 0.05 | ~40,000 | Greenish |
| B | 6.33 | 22.04 | 0.37 | 0.05 | 0.20 | 0.026 | —*** | 0.20 | 0.05 | " | Lighter Green |
| 1 | 6.06 | 22.43 | — | — | — | — | 0.465 | 0.20 | 0.052 | 100 to 200 | Amber |
| 2 | 6.06 | 22.31 | — | — | 0.20 | 0.026 | 0.465 | 0.20 | 0.052 | " | Light Amber |
| 3 | 6.06 | 22.00 | 0.55 | — | — | — | 0.465 | 0.50 | 0.052 | ~100 | Bluish Green |
| 4 | 6.06 | 21.88 | 0.55 | — | 0.20 | 0.026 | 0.465 | 0.50 | 0.052 | " | Greenish |
| 5 | 6.06 | 21.71 | 1.175 | — | — | — | 0.465 | 0.85 | 0.052 | ~150 | Greenish |
| 6 | 6.06 | 21.38 | 1.48 | — | — | — | 0.465 | 1.05 | 0.052 | ~500 | Greenish |
| 7 | 6.06 | 20.65 | 2.405 | — | — | — | 0.465**** | 1.55 | 0.052 | ~1,000 | Greenish |
| 8 | 6.06 | 22.43 | — | — | — | — | 0.465 | 0.20 | 0.052 | ~40,000 | Greenish |
| 9 | 6.06 | 22.31 | — | — | 0.20 | 0.026 | 0.465 | 0.20 | 0.052 | " | Lighter Green |

*% of glass to be obtained
**Number of bubbles per kg of glass
***about 2 mm in size
****less than 0.2 mm in size The agglomerates of refining agents were made from a mixture, in powder state, of gypsum (3 kg), charcoal (0.411 kg) and carboxymethylcellulose (0.150 kg) by spraying the mixture with water while tumbling it in a rotary device of the type called a granulation bowl or plate. Aiming at an average nodule size of 2 mm, agglomerates of between 1.5 and 2.5 mm in diameter were selected. Drying of the product was performed at 110° C. By analysis, it was found that the product contained 11% carbon and 43% sulfur expressed in the form of $SO_3$, or about 1.7 atom of carbon per mole of $SO_3$.

The test conditions, the subject of Table II and which are specified below, should not be considered as corresponding to an industrial manufacturing standard. Actually, these meltings were performed with laboratory equipment thus making it possible to choose a standard mode of operation that did not lead to perfect refining, regardless of the mixture studied, thus making it possible quantitatively to differentiate the effectiveness of the additives used by counting the number of bubbles existing after cooling of the glass.

According to this standard of operation, the meltings were performed with a furnace with a rotary hearth able to receive four identical platinum pots, with a capacity of 0.4 liter. The vitrifiable mixtures to be compared were placed therein in three equal charges of about 320 grams at 25 minutes intervals, this period corresponding approximately to the time necessary for the disappearance of the batch. The furnace temperature was kept at 1440° C. during the entire melting phase, and stabilized at this value for the so-called refining phase; the latter was considered as beginning 25 minutes after the last charging and as stopping at the end of 30 minutes.

The pots were then taken from the furnace and the glass was poured in sheets about 1 cm thick.

An annealing treatment was then applied to these glass sheets, making it possible to prepare samples of the same size with each glass obtained.

The results in Table II show the influence of the size or form of the additions of sulfate and carbon. By comparison of melts A, 1 and 8, or of melts B, 2 and 9, it can be seen that substitution of the agglomerated refining agents having a base of sulfate and carbon for equivalent amounts of powdered materials, in mixture with the other constituents of the charge, improves refining of the melt, notably when the dimension of the agglomerates is on the order of 2 mm (melts 1 and 2), whereas this benefit is hardly noticeable for dimensions less than 0.2 mm, which is of the same order as the average particle size of the main constituents of the mixture and in particular of sand (melts 8 and 9).

Thus it is possible to establish by examination of column 12 and Table II that the invention is compatible with a great range of the degree of oxidation-reduction of the glass. It accommodates itself to the varied proportions of the additions of sulfates directly to the glassmaking mixture and/or that result from the presence of sulfates and carbon on the agglomerated refining agent; and in no way does it exclude the introduction of other additions, such as $As_2O_3$ and $NaNO_3$, particularly making possible adjustment of the tint. Thus, melts 1 and 2 exhibit the amber tint characteristic of sulfides, whereas the tint of glasses 4 to 7 show the disappearance of the sulfides under the effect of increasing additions of sodium sulfate.

On the other hand, by adopting clearly reducing melting conditions, it is possible to make glasses rich in sulfides, and particularly frits that can be used as means of sulfide additions to other glasses.

EXAMPLE 2

As already said above, use of the invention in industrial fabrication is of particular interest in making glasses with very slight iron content. This example describes the industrial making of flint bottle glass using the agglomerates according to the invention and shows some of the main advantages that they offer.

The following materials were used:

plaster: "prefabrication" variety, containing about 55% $SO_3$ in the form of $CaSO_4 0.5H_2O$ and having an apparent density 0.8;

powdered coke: particle size less than 0.2 mm, containing about 83% C and having an apparent density of 0.6.

Each preparation used 34.5 kg of plaster, 5.5 kg of coke, and 20 kg of water, the $SO_3/C$ molar ratio corresponding approximately to ½ (0.6).

The agglomerates were prepared with a mixer comprising, on the one hand, plowshare blades mounted on a horizontal shaft turning at a relativley slow speed and, on the other hand, knives mounted on a second shaft, at right angles to the first, and inclined 30° in relation to the horizontal turning at a much faster speed functioning to avoid the formation of too coarse agglomerates.

At first mixing was done dry for about 2 minutes, then water was gradually added for about 2 minutes and then the mixture was stirred for about 1 minute. The resulting agglomerates were then removed from the apparatus and the setting of the plaster was completed by leaving them 4 to 5 minutes on a conveyor belt.

The resulting agglomerates were then sifted to retain the size fraction of between 1 and 5 mm (about 80%), the rejects (about 20% coarse and fines) being kept to be recycled in the mixture of the following charge. The agglomerates were then dried in an apparatus of the vibrated fluidized bed type, with continuous operation, in which the bed temperature reached about 110°–120° C.

The apparent density of the dried granules was on the order of 0.8, which is sufficiently close to that of the other main materials going into the composition of the vitrifiable mixture for it to be relatively easy to avoid an undesirable segregation of the granules during handling preceding melting of the vitrifiable mixture with which they were incorporated. The incorporation of the refining agent in the mixture in agglomerated form makes a notable gain in capacity and yield. Thus, in a regenerative end-fired furnace heated with fuel oil with a surface area of 37 m$^2$ for a draw of 100 to 110 T/day and with incorporation of 22% cullet, it was possible, for example, to establish a very notable drop of the temperatures to be maintained (1550° C. instead of 1600° C. in the crown; 1300° C. instead of 1350° C. at the throat) and in the consumption of energy (6% to 7%).

I claim:

1. In the process for making glass in which a refining agent comprising a mixture of metal sulfates and reducing agents is dispersed uniformly throughout the vitrifiable charge of glassmaking raw materials prior to melting the charge, and in which the vitrifiable charge is heated to melt the charge and to cause the refining agent to evolve gases which enlarge bubbles of other gasses and remove them from the molten glass as the bubbles rise upwardly in the molten glass to escape therefrom at the upper surface thereof;
   the improvement which comprises employing as the refining agent finely-divided particles of metal sulfate and a reducing agent having a particle size of less than about 0.1 mm, the finely-divided particles of metal sulfate and reducing agent being intimately mixed together and formed into agglomerates at least 10 times greater in size than the average particle size of their constituent materials, and wherein the relative amounts of reducing agent and metal sulfate in the agglomerates is such that the reducing agent can reduce at least one-fourth of the sulfate ions (SO$_4$=) to the state of sulfide ions (S=), and wherein the amount of refining agent added to the vitrifiable charge of glassmaking raw materials is such that the amount of created sulfide, expressed as SO$_3$, is at least 0.05% by weight of the glass to be obtained.

2. The process according to claim 1 in which the glassmaking raw materials are mixed together and formed into agglomerates approximately the same size as the agglomerates of the refining agent.

3. The process according to claim 1 in which the glassmaking raw material and agglomerates of refining agents are mixed together and formed into agglomerates.

4. The process according to claim 1 in which the agglomerates are between 1 and 5 mm in size.

5. The process according to claim 1 in which the reducing agent constituent of the refining agent is a carbonaceous material.

6. The process according to claim 5 in which the carbonaceous material is charcoal.

7. The process according to claim 1 in which the metal sulfate constituent of the agglomerated refining agent is calcium sulfate.

8. The process according to claim 7 in which the calcium sulfate is plaster of Paris.

9. The process according to claim 1 in which the binder for the agglomerates of finely-divided particles of refining agent is tar.

10. The process according to claim 1 in which the binder for the agglomerates of refining agent is a heavy fuel oil.

11. The process according to claim 1 in which the binder for the agglomerates of refining agent is carboxymethylcellulose.

12. The process according to claim 1 in which the binder for the agglomerates of refining agent is sodium silicate.

* * * * *